(12) United States Patent
Eriksen

(10) Patent No.: US 11,454,307 B2
(45) Date of Patent: Sep. 27, 2022

(54) ELECTRO MECHANICAL POWER ACTUATOR

(71) Applicant: Electrical Subsea & Drilling AS, Straume (NO)

(72) Inventor: Egil Eriksen, Ål (NO)

(73) Assignee: Electrical Subsea & Drilling AS, Straume (NO)

( * ) Notice: Subject to any disclaimer, the term of this patent is extended or adjusted under 35 U.S.C. 154(b) by 0 days.

(21) Appl. No.: 16/756,661

(22) PCT Filed: Oct. 17, 2018

(86) PCT No.: PCT/NO2018/050246
§ 371 (c)(1),
(2) Date: Apr. 16, 2020

(87) PCT Pub. No.: WO2019/078727
PCT Pub. Date: Apr. 25, 2019

(65) Prior Publication Data
US 2020/0340562 A1    Oct. 29, 2020

(30) Foreign Application Priority Data

Oct. 17, 2017  (NO) .................................. 20171649

(51) Int. Cl.
*F16H 25/22* (2006.01)
*E21B 33/06* (2006.01)
*F16H 25/20* (2006.01)

(52) U.S. Cl.
CPC ....... *F16H 25/2247* (2013.01); *E21B 33/063* (2013.01); *F16H 2025/2053* (2013.01); *F16H 2025/2081* (2013.01)

(58) Field of Classification Search
CPC ......... F16H 2025/2053; F16H 25/2247; F16H 2025/2081; F16H 25/2006; E21B 33/063; E21B 33/061; E21B 33/06
(Continued)

(56) References Cited

U.S. PATENT DOCUMENTS 4,373,404 A * 2/1983 Heinz ...................... F16H 25/20
    74/89.25
5,653,418 A * 8/1997 Olson ...................... E21B 29/08
    251/1.3
(Continued)

FOREIGN PATENT DOCUMENTS

GB       2489019        9/2012
NO       20130157       8/2013
(Continued)

OTHER PUBLICATIONS

Norwegian Search Report for No. 20171649, dated Apr. 27, 2018.
(Continued)

*Primary Examiner* — Jake Cook
*Assistant Examiner* — Gregory Robert Weber
(74) *Attorney, Agent, or Firm* — Andrus Intellectual Property Law, LLP

(57) ABSTRACT

An actuator is for use in petroleum exploitation and is configured for displacing a rod for engaging a well barrier device. The actuator has a housing for at least a portion of the rod; at least two roller screws rotatably arranged in the housing; rotational means connected to the roller screws via one gear systems for each roller screw for simultaneous rotation of the roller screws; and a roller nut engaging each roller screw. The roller screws and roller nuts are configured such that rotation of the roller screws result in displacement of the roller nuts relative to the roller screws. Each roller nut is coupled with one actuation element via spherical bearings,
(Continued)

and each actuation element is configured for mechanical coupling to an end portion of the rod for displacing the rod in operational use.

12 Claims, 4 Drawing Sheets

(58) Field of Classification Search
USPC ........................................................ 74/89.27
See application file for complete search history.

(56) References Cited

U.S. PATENT DOCUMENTS

| | | | | |
|---|---|---|---|---|
| 7,950,300 | B2* | 5/2011 | Murata | F16H 25/20 |
| | | | | 74/25 |
| 8,322,242 | B2* | 12/2012 | Gronli | F16H 25/20 |
| | | | | 74/89.27 |
| 8,424,607 | B2* | 4/2013 | Springett | E21B 33/063 |
| | | | | 166/298 |
| 9,267,587 | B2* | 2/2016 | Abevi | F16H 25/2252 |
| 9,388,888 | B2* | 7/2016 | Eriksen | H02K 5/132 |
| 2007/0295120 | A1* | 12/2007 | Gerbier | B64C 13/505 |
| | | | | 74/25 |
| 2011/0041632 | A1* | 2/2011 | Baker | B64C 13/341 |
| | | | | 74/89.23 |
| 2011/0072920 | A1* | 3/2011 | Gronli | F16H 25/20 |
| | | | | 74/89.29 |
| 2011/0209314 | A1* | 9/2011 | Miller | B60P 3/079 |
| | | | | 24/68 CD |
| 2016/0280357 | A1 | 9/2016 | Himmelmann | |
| 2019/0069964 | A1* | 3/2019 | Hagn | A61B 34/37 |
| 2020/0180581 | A1* | 6/2020 | Shigeta | B60T 13/745 |

FOREIGN PATENT DOCUMENTS

| | | |
|---|---|---|
| WO | 2005050062 | 6/2005 |
| WO | 2008047066 | 4/2008 |
| WO | 201126378 | 10/2011 |
| WO | 2017138816 | 8/2017 |

OTHER PUBLICATIONS

International Search Report and the Written Opinion for PCT/NO2018/050246, dated Dec. 11, 2018.
Reply to the Written Opinion for PCT/NO2018/050246, dated Aug. 14, 2019.
Written Opinion for PCT/NO2018/050246, dated Sep. 24, 2019.
International Preliminary Report on Patentability for PCT/NO2018/050246, dated Jan. 9, 2020.

* cited by examiner

ELECTRO MECHANICAL POWER ACTUATOR

CROSS-REFERENCE TO RELATED APPLICATIONS

This application is the U.S. national stage application of International Application PCT/NO2018/050246, filed Oct. 17, 2018, which international application was published on Apr. 25, 2019, as International Publication WO 2019/078727 in the English language. The International Application claims priority of Norwegian Patent Application No. 20171649, filed Oct. 17, 2017. The international application and Norwegian application are both incorporated herein by reference, in entirety.

FIELD

The invention relates to an actuator with independent actuation elements. More precisely, the invention relates to an actuator where roller screws are rotated to displace roller nuts coupled to the roller screws, wherein an actuation element is coupled to each roller nut by means of a spherical thrust bearing. The roller nut displaces the actuation element which further may be coupled to a rod for actuating a well barrier or cutting device in a blow-out preventer or workover stack.

BACKGROUND

The term "power actuator" is used to emphasize that the invention is suitable for use in applications where there is a need for large actuation forces. An example of use may be as a cut- or barrier device in a blow-out preventer (BOP). BOP's have a set of such devices to prevent discharge of hydrocarbons during drilling and completion of wells. The devices are typically operated hydraulically. Hydraulic BOP's are large and heavy, and usually require hydraulic communication to surface when used subsea. Further, to avoid pressure drop in return lines of subsea BOP's, the hydraulic fluid is normally vented to sea.

Due to the above-mentioned and other challenges related to hydraulic systems, electro-mechanical actuators are developed for use subsea. The actuation force is typically generated by electric motors. Manual override by means of for example ROV (Remote Operated Vehicle) is usually provided in case of electric failure. Patent document NO20130157 discloses a power actuator with cooperative screw-nut-connections connected to a common actuating element, and wherein an electric motor drives the screws or nut via transmission elements to displace the actuating element. Accuracy during assembly and even load distribution between the screws are required to avoid inducing a large bending moment in the screws and actuation element during operation.

SUMMARY

The invention has for its object to remedy or to reduce at least one of the drawbacks of the prior art, or at least provide a useful alternative to prior art.

The object is achieved through features, which are specified in the description below and in the claims that follow.

It is provided an actuator for generating a large axial force, where rotation of roller screws results in parallel, axial displacement of roller-nuts comprising thread-rolls engaging threads on the screws.

Each roller-nut is arranged with an actuation element prevented from rotating and connected to the roller-nut with a spherical thrust bearing.

The invention is defined by the independent patent claims. The dependent claims define advantageous embodiments of the invention.

In a first aspect the invention relates more particularly to an actuator for use in petroleum exploitation, the actuator being configured for displacing a rod for engaging a well barrier device, wherein the actuator comprises:

a housing for housing at least a portion of the rod;

at least two roller screws rotatably arranged in the housing;

rotational means connected to the roller screws by means of one gear systems for each roller screw for simultaneous rotation of the roller screws;

a roller nut engaging each roller screw, the roller screws and roller nuts are configured such that rotation of the roller screws result in displacement of the roller nuts relative to the roller screws;

wherein each roller nut is coupled with one actuation element via spherical bearings, and wherein each actuation element is configured for mechanical coupling to an end portion of the rod for displacing the rod in operational use.

The invention solves the above-mentioned challenges by coupling each roller-nut with a separate actuation element, instead of a common actuation element as known from the prior art. Separate actuation elements may not transfer bending moment between each other in case of biased loading from the roller nuts. The actuation elements may envelop an end of the roller nuts. The actuation elements may be prevented from rotating by the housing or contact with each other. The roller screw may be fully threaded or partially threaded and the roller nuts may be arranged concentrically on the screws. The roller nuts may comprise a nut housing. The nut housing may comprise thread rollers coupled to the threads on the screws. The rotation of a screw may be transferred to the thread rollers, which in turn translate the rotation into an axial movement of the roller nut along the screw. The axial movement of the roller nuts along the screws may displace the actuation elements coupled to the roller nuts. The actuation elements may be connected to the roller nuts by means of bearings. The bearings may be circular. In one embodiment, the bearings may be spherical thrust bearings, the bearings being configured to take a load in the direction of the displacement of the actuation elements. The actuation elements may be arranged to form a contact face for a rod.

The roller screws may be coupled to bearings for enabling rotation of the screw. It should be understood that a screw may be any other similar feature, such as a bolt. The bearings may be connected to the housing. Either end portion of the screws may be coupled to the bearings.

Each roller screw may be connected to a dedicated gear system, the gear system further being connected to a dedicated rotational means. In one embodiment, the rotational means may be a motor. By operating with separate rotational means the adjustment of load distribution between the actuation elements during assembly may be simplified. The gear systems may be arranged in a separate chamber, isolated from the housing comprising the roller-screw, roller-nut etc. The chamber may comprise a fluid for lubrication of the gear systems.

In one embodiment, the actuator may be configured for use in a blow-out preventer. In another embodiment, the actuator may be configured for use in well intervention equipment. The actuator may also be used in other applications requiring large actuation forces. A large actuation force may be in the range between 800-2000 metric tons. The actuator may be configured for displacing a rod for engaging a cutting device, for example to cut a drill string.

Exactly two roller screws may be rotatably arranged in the housing. Having two roller screws is a preferred configuration as the size of the actuator is limited compared to having more than two roller screws. For most relevant applications an actuator with two roller screws will generate sufficient force for the intended task. The two roller screws may be arranged parallel in the housing. The two roller screws may be arranged such that the direction of the threads is the same for both screws.

In one embodiment, the actuator may comprise the rod, wherein the portion of the rod is arranged in the housing and the end portion of the rod is mechanically coupled to the actuation elements. The rod may comprise a rounded end surface, the rounded end surface may be complementary to a contact face on the actuation elements. The rod may be coupled to the actuation elements such that it can be displaced in both directions along its longitudinal axis. The rod may extend out of the housing through an opening in the housing. The opening may seal around the rod to avoid penetration of liquid into the housing.

In one embodiment, the actuator may comprise a common gear for connecting the gear systems together. The common gear may enable rotation of all screws with only one rotational means as the rotation is transferred between the gear systems via the common gear.

The roller screws may be configured to be rotated by rotation of the common gear. The common gear may comprise a connection for an external rotational mean, for example a torque device on a ROV. Operating the actuator with an external rotational means may be required if for example power to the actuator is lost. The connection to the common gear may penetrate the housing for enabling connection of the external rotational means.

In one embodiment, the rotational means may be electric motors. An electrical motor requires no associated equipment such as fluid supply, valves and accumulators, as compared to for example a hydraulic motor. It further eliminates discharge of hydraulic fluid to the surroundings. The electric motors may comprise at least two sets of windings for redundancy. The actuation force may be controlled by the power supplied to the motors. Each motor may be arranged in a motor housing. The housing may comprise a low viscosity- and electrically isolating fluid. Each motor may further comprise pulse transmitters and encoders for synchronised operation of the motors.

In one embodiment, the actuator may comprise a control system for adjusting the output from each electric motor. The control system may further be configured to read the relative position of the actuation elements in the housing.

The actuator may comprise a brake system. In use, the brake system may interact with the common gear. The brake system may comprise a restraining device, a spring and an electro magnet. The restraining device may be displaceable and prevented from rotating. The brake system may be disengaged when voltage is supplied to the electro magnet. The brake system may be engaged when voltage is not supplied to the electro magnet. The restraining device may be coupled to the common gear when the brake system is engaged. The restraining device may be complementary to grooves in a boss on the common gear. The spring may induce a load on the restraining device for displacing the restraining device such that it couples with the common gear. The electro magnet may decouple the restraining device from the common gear by inducing a load on the restraining device which is opposite and larger than the spring load. The rotational means may provide a rotational force which is larger than a brake force induced by the brake system for operation of the actuator under unintentional engagement of the braking system.

In one embodiment, the actuator may comprise a pressure compensator. The housing and/or the motor housings may be connected to a pressure compensator for regulating the pressure in the housing and/or motor housing. The pressure compensator may be in fluid communication with a fluid surrounding the actuator. In one embodiment, the pressure compensator may be arranged inside the respective housing. In another embodiment, the pressure compensator may be arranged outside the respective housing, being in fluid communication with the housing.

BRIEF DESCRIPTION OF THE DRAWINGS

In the following is described examples of preferred embodiments illustrated in the accompanying drawings, wherein.

DETAILED DESCRIPTION OF THE DRAWINGS

Figure 1:
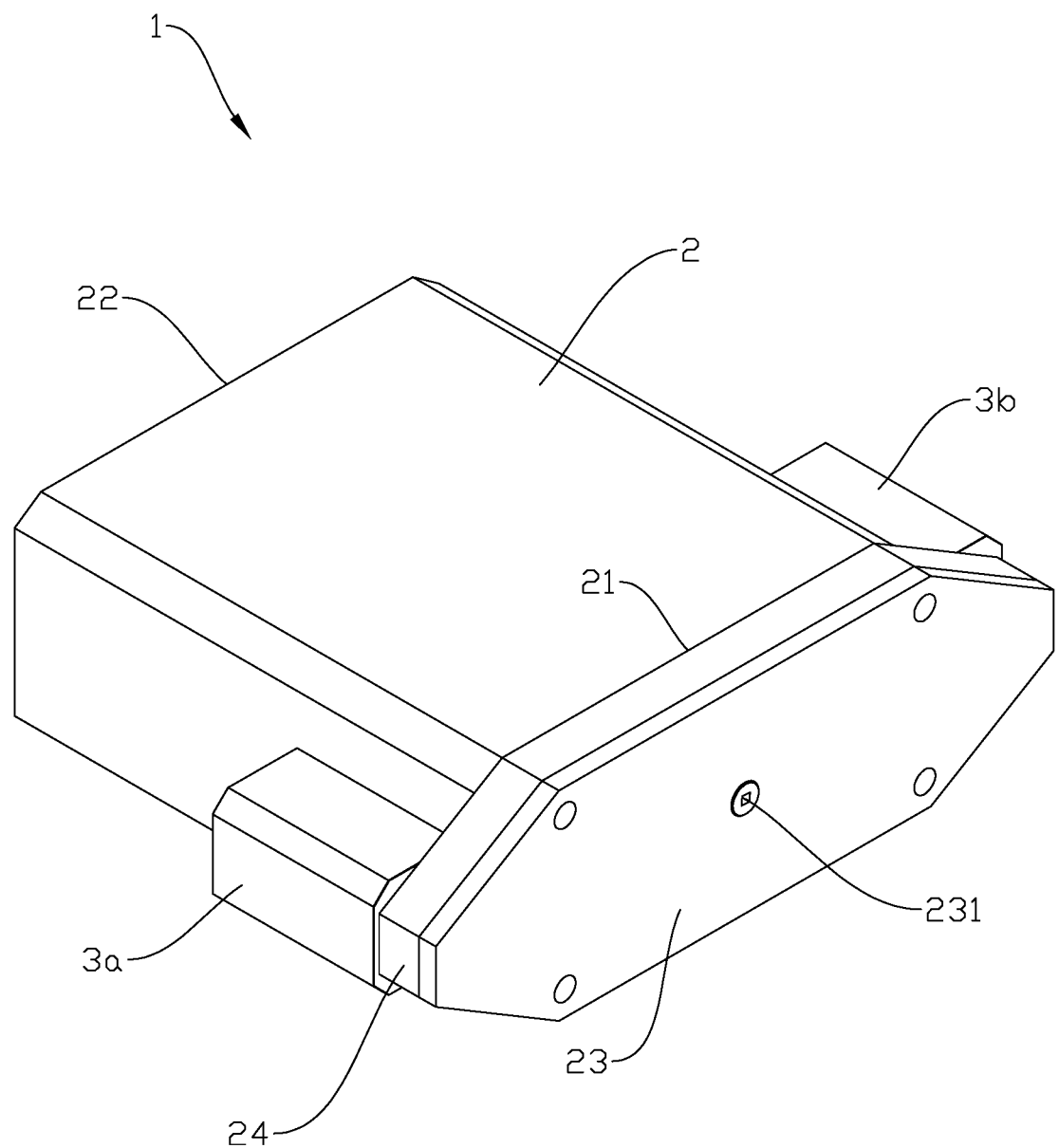
FIG. 1 shows a perspective view of the actuator according to one embodiment of the invention.

The figures are depicted in a simplified manner, and details that are not relevant to illustrate what is new with the invention may have been excluded from the figures. The different elements in the figures may necessarily not be shown in the correct scale in relation to each other. Equal reference numbers refer to equal or similar elements. In what follows, the reference numeral 1 indicates an actuator according to one embodiment of the invention. The actuator 1 comprises a housing 2 with an end plate 24 and an end cover 23. Two motor housings 3a, 3b each comprising an electric motor 30a, 30b are connected to the end plate 24. The end cover 23 comprises an opening for an intervention adapter 231 for manual operation of the actuator 1, or override of the motors, for example by an ROV tool (not shown).

Figure 2:
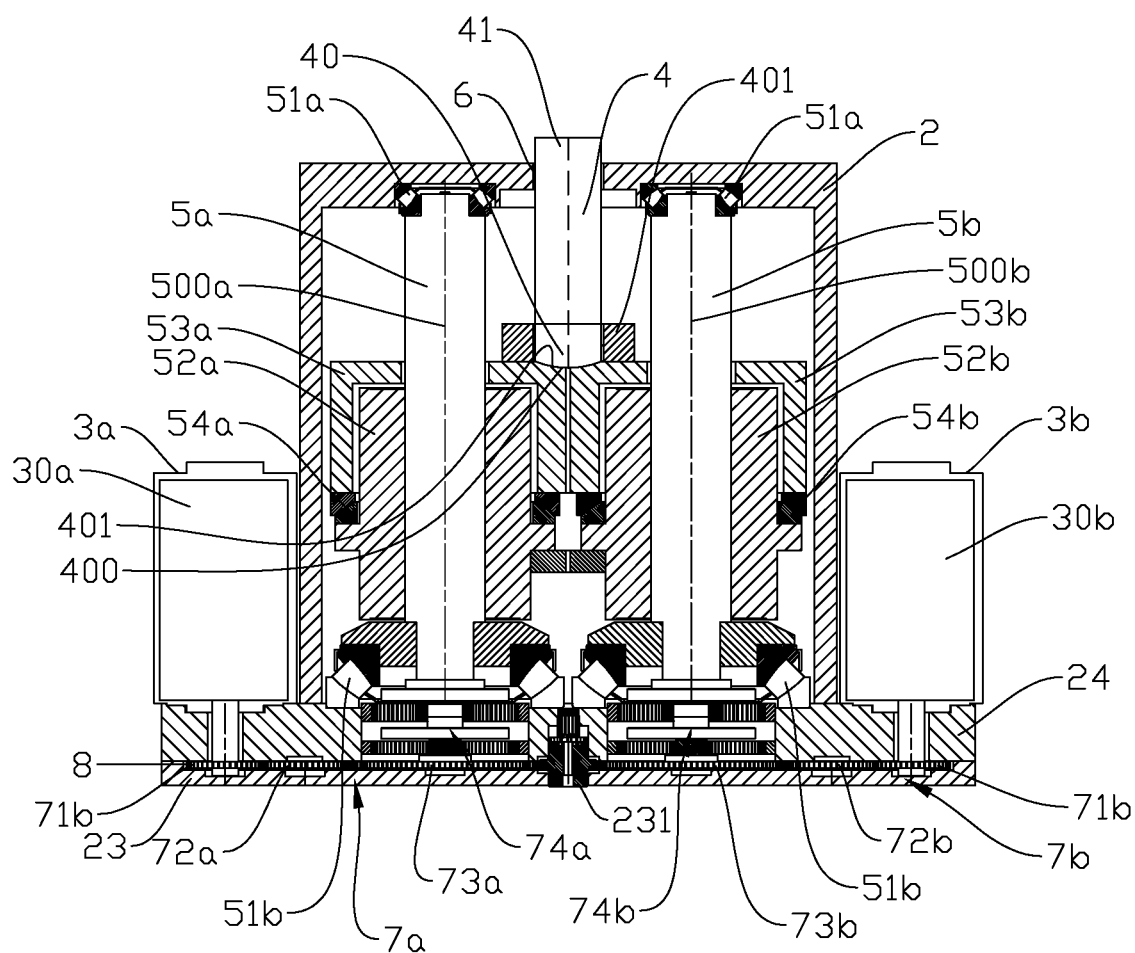
FIG. 2 shows a cross-section through the actuator in FIG. 1.

FIG. 2 shows a cross-section through the actuator 1. Two roller screws 5a, 5b are supported in the housing 2 by a thrust bearing 51a, 51b in either end of the screws 5a, 5b. The thrust bearings 51a, 51b enable rotation of the screws 5a, 5b around its longitudinal axis 500a, 500b. Each screw 5a, 5b is arranged with a roller-nut 52a, 52b. The roller-nuts 52a, 52b comprises threaded rollers (not shown) in engagement with the threads (not shown) on the screws 5a, 5b. The threaded rollers enable the rotation of the screw 5a, 5b to be translated into an axial movement of the roller nut 52a, 52b along the screw 5a, 5b. Direction of axial movement of the roller-nuts 52a, 52b depends on the direction of rotation of the screw 5a, 5b.

The roller nuts 52a, 52b are connected to actuation elements 53a, 53b by means of thrust bearings 54a, 54b. The thrust bearings 54a, 54b are spherical and concentrically arranged on the roller nuts 52a, 52b and actuation elements 53a, 53b. The thrust bearings 54a, 54b enable rotation of the roller nuts 52a, 52b without transferring the rotational movement to the actuation elements 53a, 53b. The actuation elements 53a, 53b envelop an end portion of the roller nuts 52a, 52b.

A rod 4 protrudes the housing 2 through an opening 6. The opening 6 is sealing around the rod 4. The rod 4 is connected to the two actuation elements 53a, 53b by means of a bracket 401. The actuation elements 53a, 53b form a common contact face 400 for the rod 4. The contact face 400 is spherical and complementary to a first end portion 40 of the rod 4. A second end portion 41 of the rod 4 is connectable to e.g. a device (not shown) arranged in a machined block with cavities for well barrier devices (not shown).

Each of the two electric motors 30a, 30b in the motor housings 3a, 3b comprise a stator, the stator comprising two sets of independent windings and a rotor. The stator is supplied with electric current via wires (not shown). Each of the motors are connected to a gear system 7a, 7b. Each gear system 7a, 7b comprises a first gear 71a, 71b coupled to the motor. The first gear 71a, 71b drives a second gear 72a, 72b and a third gear 73a 73b. The third gear 73a, 73b being connected to a planetary gear 74a, 74b. The planetary gear 74a, 74b is connected to the screw 5a, 5b.

Figure 3:
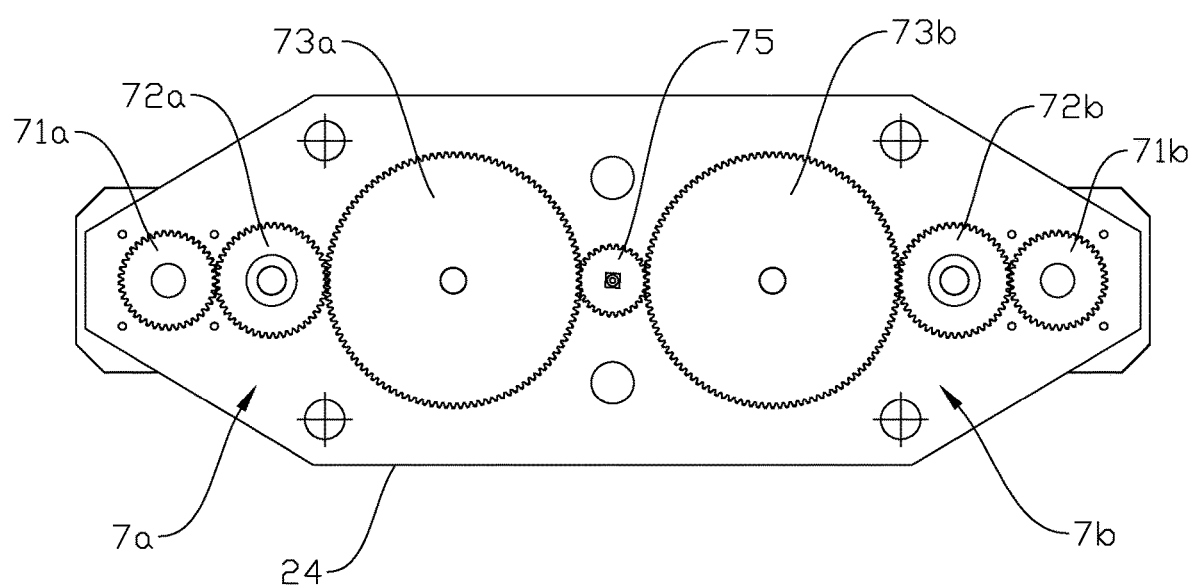
FIG. 3 shows, in a larger scale than FIG. 1, a sideview of the actuator without the end coyer.

FIG. 3 shows a sideview of the actuator 1 without the end cover 23. The gear systems 7a, 7b are arranged in a void 8 between the end plate 24 and the end cover 23. In use, the void 8 is filled with a fluid (not shown) for lubricating the gears. The gear systems 7a, 7b are connected by a common gear 75 arranged between the third gears 73a, 73b. The common gear 75 enables rotation of both screws 5a, 5b by operating only one motor. The common gear 75 is also coupled to the intervention adapter 231. If the motors fail, the actuator 1 can be operated via the intervention adaptor 231 by connecting a rotational tool (not shown) thereto.

Figures 4A, 4B:
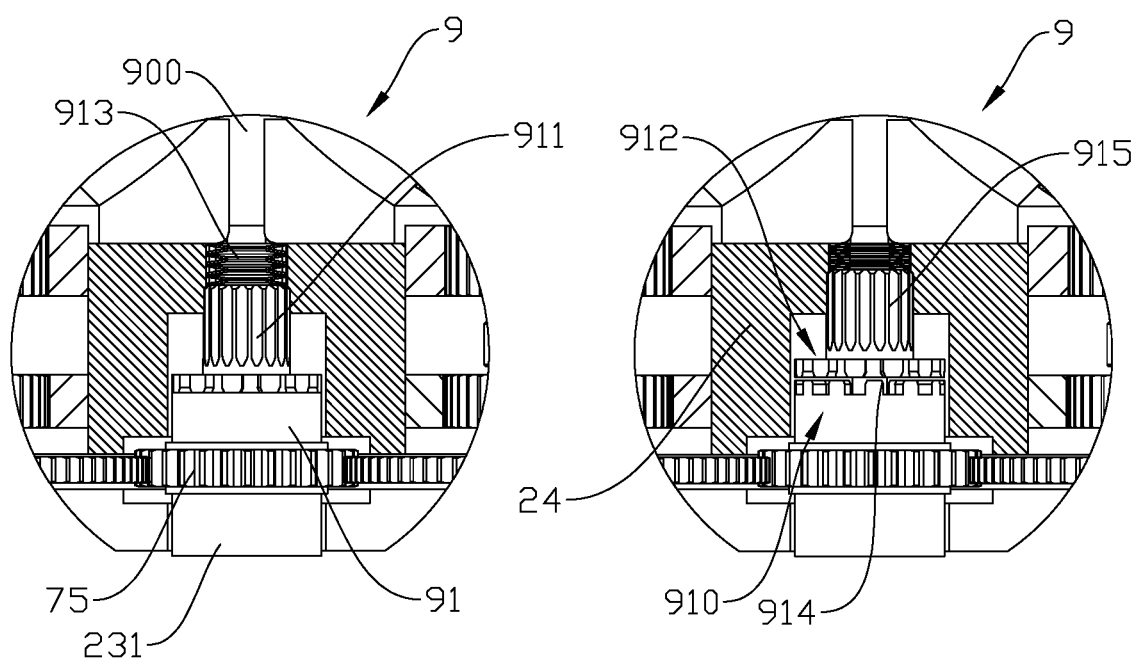
FIG. 4a shows a detailed view of the braking system in a larger scale than FIG. 2, the brake system being engaged.
FIG. 4b shows a detailed view of the braking system in the same scale as FIG. 4a, the brake system being disengaged.

FIGS. 4a and 4b shows a detailed view of the brake system 9, wherein FIG. 4a shows the brake system 9 when it is engaged, and FIG. 4b shows the brake system 9 when it is disengaged. The common gear 75 comprises a boss 91, wherein the boss 91 has a toothed end portion 910. A restraining device 911 comprises a toothed end portion 912 complementary to the toothed end portion 910 on the boss 91. An end portion of the restraining device 911 is coupled with a spring 913 opposite of the toothed end portion 912. The restraining device 911 comprises grooves 915 coupled to complementary grooves (not shown) in the end plate 24 to prevent the restraining device 911 from rotating. The restraining device 911 is displaceable along a centre axis 900 of the common gear 75. A spring force from the spring 913 is acting on the restraining device 911 and can displace it towards the boss 91. The toothed portions 910, 912 will mate and the restraining device 911 will restrain the common gear 75 from rotating. An electromagnet (not shown) is configured to, in use, counteract and overcome the spring force acting on the restraining device 911. When the common gear 75 is driven by the motors, the electromagnet is engaged and disconnects the restraining device 911 from the boss 91, such that the common gear 75 is free to rotate. If power to the actuator 1 is lost or shut off, the electromagnet is disengaged, and the spring 913 will displace the restraining device 911, and thus engage the brake system 9. In one embodiment, friction between the restraining device 911 and the boss 91 can contribute to braking the common gear 75.

The teeth on the toothed end portions 910, 912 have chamfered corners 914. When the brake is engaged, i.e. the toothed end portions are mated, the chamfered corners 914 enables the boss 91 to ratchet with respect to the restraining device 911 if the rotational force acting on the common gear 75 exceeds a certain value (not defined). Ratcheting means that the teeth on the boss 91 can jump from one groove between teeth on the restraining device 911 to the next groove. Should the electromagnet unintentionally fail and the brake system 9 be engaged, the motors are strong enough to ratchet the boss 91, thus rotate the common gear 75.

Connecting a complementary rotational tool (not shown) to the intervention adaptor 231 will also disengage the brake system 9. When the tool is connected to the intervention adaptor 231, the restraining device 911 will be pushed back and the toothed end portions 910, 912 be unmated.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. Use of the verb "comprise" and its conjugations does not exclude the presence of elements or steps other than those stated in a claim. The article "a" or "an" preceding an element does not exclude the presence of a plurality of such elements.

The mere fact that certain measures are recited in mutually different dependent claims does not indicate that a combination of these measures cannot be used to advantage.

The invention claimed is:

1. An actuator for use in petroleum exploitation, the actuator being configured for engaging a well barrier device, wherein the actuator comprises:
   a housing;
   a rod having a rounded end surface, wherein at least a portion of the rod is arranged in the housing;
   at least two actuator assemblies, wherein each actuator assembly comprises:
      a roller screw rotatably arranged in the housing;
      a rotational means connected to the roller screw by means of a gear system;
      a roller nut engaging the roller screw, the roller screw and the roller nut configured such that rotation of the roller screw results in displacement of the roller nut relative to the roller screw in an axial direction; and
      an actuation element coupled to the roller nut via a spherical bearing;
   wherein each of the gear systems is configured to enable simultaneous rotation of each of the roller screws of the at least two actuator assemblies; and
   wherein each of the actuation elements is mechanically coupled to an end portion of the rod such that the rounded end surface contacts a complementary contact face on each of the actuation elements for displacing the rod in the axial direction in operational use.

2. The actuator according to claim 1, wherein exactly two roller screws are rotatably arranged in the housing.

3. The actuator according to claim 2, further comprising a common gear for connecting each of the gear systems together.

4. The actuator according to claim 2, wherein the rotational means comprises an electric motor.

5. The actuator according to claim 1, further comprising a common gear for connecting each of the gear systems together.

6. The actuator according to claim 5, wherein each of the roller screws are configured to be rotated by rotation of the common gear.

7. The actuator according to claim 6, wherein the rotational means comprises an electric motor.

8. The actuator according to claim 5, wherein the rotational means comprises an electric motor.

9. The actuator according to claim 1, wherein the rotational means comprises an electric motor.

10. The actuator according to claim 9, further comprising a control system for controlling each of the electric motors.

11. The actuator according to claim 1, further comprising a brake system.

12. The actuator according to claim 1, wherein the rounded end surface of the rod directly contacts the complementary contact face on each of the actuation elements.

* * * * *